UNITED STATES PATENT OFFICE.

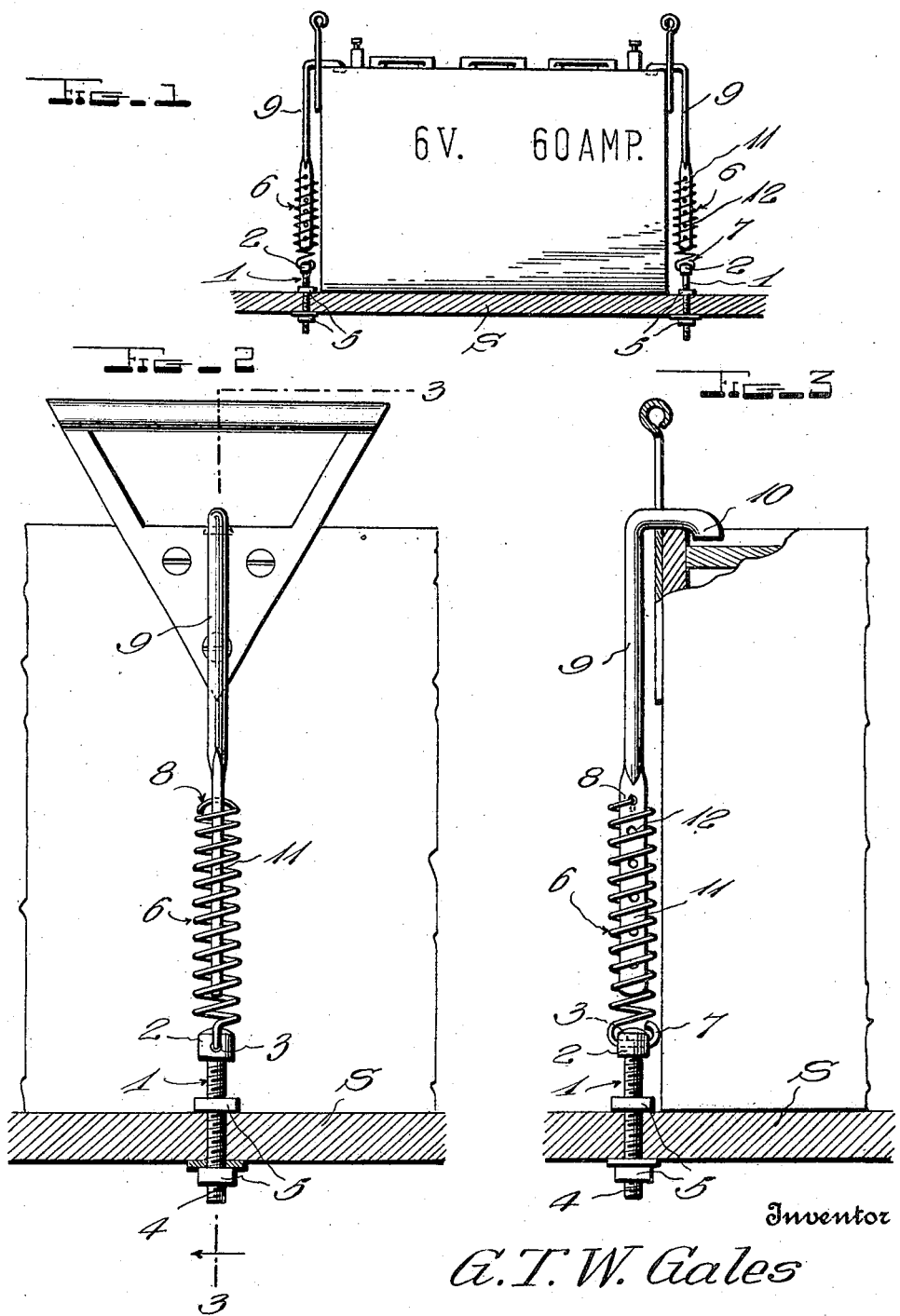

GEORGE T. W. GALES, OF UNIONTOWN, PENNSYLVANIA.

BATTERY-CLAMP.

1,392,757.  Specification of Letters Patent.  Patented Oct. 4, 1921.

Application filed January 2, 1920. Serial No. 349,102.

*To all whom it may concern:*

Be it known that I, GEORGE T. W. GALES, a citizen of the United States, residing at Uniontown, in the county of Fayette and State of Pennsylvania, have invented certain new and useful Improvements in Battery-Clamps; and I do declare the following to be a full, clear, and exact description of the invention, such as will enable others skilled in the art to which is appertains to make and use the same.

This invention relates to improvements in battery clamps.

The principal object is to provide a clamp for securing a storage battery or the like to a support such as the floor or running-board of an automobile.

Another object is to provide a simple and practical clamp of this character which may be easily and quickly adjusted for use on different sized batteries.

With the above and other objects in view, the invention consists of certain novel features of construction and the combination and arrangement of parts as will be more fully described and claimed.

I attain these objects by constructing the clamp substantially as illustrated in the accompanying drawings in which:

Figure 1 is a side elevation showing a pair of clamps in use;

Fig. 2 is a detail end elevation of one clamp applied to use; and

Fig. 3 is a sectional view taken on the plane of line 3—3 of Fig. 2.

Similar reference numerals designate similar parts throughout the several views.

While I have shown a pair of clamps securing a storage battery to a rigid support, it is understood that these clamps may be used in connection with various other articles which are to be held against movement on a support.

Each clamping device comprises broadly a suitable anchoring means to be attached to a support, a coil spring having one end secured to said anchoring means and a substantially inverted L-shaped arm adapted to hook the article to be secured, said arm having its other end insertible into the coil spring and adjustably connected to the upper end thereof to permit adjustment of the length of the clamping device.

In providing the anchoring means I employ a bolt 1 whose head 2 is provided with a transverse opening 3 and whose shank 4 is threaded and retained in a bolt-hole in a support S by means of the spaced nuts 5.

A coil spring 6 is adapted to have its lower end bent to form a hook 7, said hook being received in the transverse opening 3 in said bolt, thereby providing means for connecting the spring and anchoring means together. The upper end of the coil spring 6 is bent to form a hook 8 whose function is about to be set forth.

In providing means for engaging a storage battery or other similar articles I employ a substantially L-shaped arm 9, one end of which is adapted to engage the upper edge of the article to be held and to have its extreme end bent to form a finger 10 which prevents accidental disengagement of said end from the article. The other end 11 of said arm is flattened and provided with a plurality of longitudinally spaced apertures 12, said flat end being insertible into the end of the spring remote from the anchoring means and removably and adjustably connected to the hook 8 formed on said spring. It is readily seen that the hook 8 may be inserted into any one of the openings 12 to vary the length of the clamping device so that it may be used on storage batteries or other articles of different dimensions. While I have described in detail the illustrated means for connecting the coil spring at its ends to the arm 9 and anchoring means, it is understood that other means of a nature closely related to that set forth may well be used with equally good results.

From the foregoing description, taken in connection with the accompanying drawings, the construction and operation of the invention will be readily understood without requiring a more extended explanation.

Various changes in the form, proportion and minor details of construction may be resorted to without departing from the principle or sacrificing any of the advantages of the claimed invention.

I claim:

A battery box clamp comprising a threaded anchoring bolt for passing through a support and having a head at its upper end provided with a transverse opening, securing nuts carried by the bolt for engaging upper and lower faces of a support, a box engaging rod having its upper end portion bent to provide a box engaging hook and having its lower end portion flattened and provided with openings, and a spiral spring coiled about the flattened portion of the rod and having its lower convolution passing through the opening in the head of the bolt and having its upper convolution passing through a selected opening of the rod to releasably and adjustably connect the spring with the lower portion of the rod.

In testimony whereof I have hereunto set my hand.

GEORGE T. W. GALES.